United States Patent [19]

Maruyama

[11] Patent Number: 4,832,279

[45] Date of Patent: May 23, 1989

[54] CLICK SOUND GENERATOR FOR SPINNING REEL

[75] Inventor: Kenji Maruyama, Hiroshima, Japan

[73] Assignee: Ryobi Ltd., Hiroshima, Japan

[21] Appl. No.: 156,848

[22] Filed: Feb. 17, 1988

[30] Foreign Application Priority Data

Feb. 20, 1987 [JP] Japan ................. 62-24753[U]

[51] Int. Cl.[4] .................................. A01K 89/02
[52] U.S. Cl. ..................... 242/84.51 R; 188/82.4
[58] Field of Search .................. 242/84.1 R, 84.2 R,
242/84.21 R, 84.5 R, 84.51 R, 217, 219, 85.51
A; 188/82.3, 82.4, 82.7, 82.77

[56] References Cited

U.S. PATENT DOCUMENTS

| | | | |
|---|---|---|---|
| 3,123,319 | 3/1964 | Hall | 242/84.51 A |
| 4,163,528 | 8/1979 | Egasaki et al. | 242/84.21 R |
| 4,391,418 | 7/1983 | Puryear | 242/84.5 A X |
| 4,477,038 | 10/1984 | Yorikane | 242/84.21 R |
| 4,546,932 | 10/1985 | Ohmori | 242/84.21 R |
| 4,614,314 | 9/1986 | Ban | 242/84.2 R X |
| 4,650,134 | 3/1987 | Councilman | 188/82.3 X |

Primary Examiner—Joseph J. Hail III
Attorney, Agent, or Firm—Finnegan, Henderson, Farabow, Garrett & Dunner

[57] ABSTRACT

A click sound generator for a spinning reel includes a clicking toothed wheel and a ratchet wheel secured to a quill that projects out of the front portion of the body of the reel. A clicking claw can be engaged with, or disengaged from, the clicking toothed wheel, and is supported on an anti-reversing lever shaft projecting out of the front portion of the body of the reel. A spring urges the clicking claw to engage the claw and clicking toothed wheel. An anti-reversing pawl is urged into engagement with the rachet wheel by a guide spring and can be disengaged from the ratchet wheel. An anti-reversing lever cam moves the clicking claw in both the axial and circumferential direction.

7 Claims, 3 Drawing Sheets

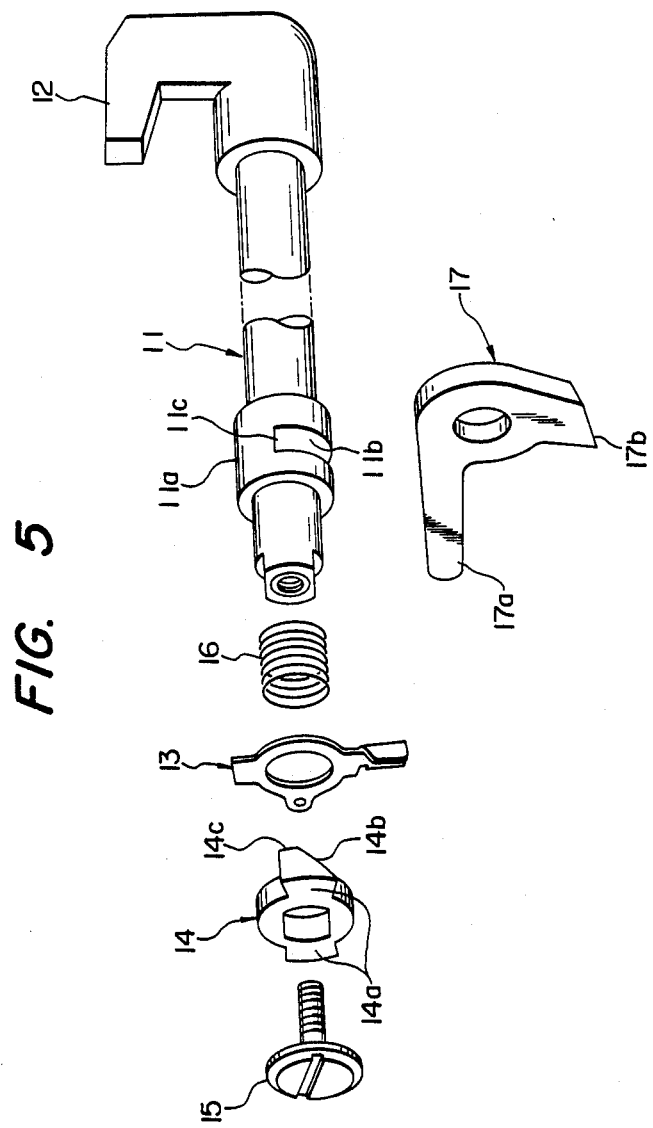

CLICK SOUND GENERATOR FOR SPINNING REEL

FIELD OF THE INVENTION

The present invention relates to a click sound generator for making a click sound when the rotor of a spinning reel is rotated to wind a fishline.

BACKGROUND OF THE INVENTION

A changer for enabling or preventing the backward rotation of a rotor of a spinning reel and a changer for unabling or preventing the generation of a click sound comprise a ratchet wheel, a pawl, a clicking toothed wheel, and a clicking claw. In a conventional click sound generator, a click sound generation selecting lever for manipulating a clicking claw is provided separately from an anti-reversing lever for selecting the forward or backward rotation of a rotor. In another conventional click sound generator, a clicking claw is changed over through a separate lever directly coupled to an anti-reversing cam.

Each of the conventional click sound generators has problems, however, in that a large number of component parts is required and the construction of the click sound generator is complicated making it troublesome, difficult, and time-consuming to assemble. Also, the prior art click sound generators are expensive and relatively heavy, which hinders the reduction in the size and weight of a reel.

SUMMARY OF THE INVENTION

An object of the present invention is to overcome the problems and disadvantages of the prior art.

An object of the present invention is a click sound generator for a spinning reel wherein rotation of an anti-reversing lever between a first position enabling reverse rotation of the reel and a second position preventing reverse rotation of the reel moves the click sound generator from a position wherein no click sound is generated to a position when a click sound is generated.

Another object of the present invention is a click sound generator including a single lever that prevents or enables the generation of a click sound and also prevents or enables reverse rotation of the spinning reel.

A further object of the present invention is a click sound generator that is easy to assembly, light-weight, and inexpensive to manufacture.

These and other objects are attained by a click sound generator for a spinning reel having a reel body supporting an anti-reverse lever mounted on a rotatable anti-reverse lever shaft for rotation between a reverse rotation prevention position and a reverse rotation enabling position comprising a clicking toothed wheel, a clicking claw mounted on the anti-reverse lever shaft, a spring for biasing the clicking claw into contact with the clicking toothed wheel when the anti-reverse lever shaft is in the reverse rotation prevention position, and an anti-reverse lever cam provided on the anti-reverse lever shaft for contacting the clicking claw to move the clicking claw against the bias of the spring and out of contact with the clicking toothed wheel when the anti-reverse lever is rotated from the reverse rotation prevention position to the reverse rotation enabling position.

BRIEF DESCRIPTION OF THE DRAWINGS

The manner by which the above objects, and other objects, features, and advantages of the present invention are attained will become fully apparent from the following detailed description when it is considered in view of the drawings, wherein:

FIG. 5 shows a perspective exploded view of major portions of the click sound generator.

DETAILED DESCRIPTION OF THE PREFERRED EMBODIMENT

In the click sound generator for a spinning reel of the present invention, an anti-reversing lever for preventing the backward rotation of a rotor and for selecting the generation or non-generation of a click sound is provided with an anti-reversing lever cam. A clicking claw can be disabled by the anti-reversing lever cam, and an anti-reversing pawl can be disabled by the groove end of an anti-reversing lever shaft. The selection of forward and backward rotation of the rotor and the selection of generation or non-generation of the click sound can be simultaneously performed by the anti-reversing lever. This reduces the number of component parts of the click sound generator and simplifies the construction thereof.

In the click sound generator, a clicking toothed wheel and a ratchet wheel are secured to a quill or similar member that projects out of a front portion of a body of a spinning reel. The clicking claw, which can be optionally engaged with or disengaged from the clicking toothed wheel, is supported on an anti-reversing lever shaft projecting out of the front portion of the body of the reel so that the clicking claw is turnable as well as movable in the axial direction of the anti-reversing lever shaft. A spring urges the clicking claw in a direction to engage the claw with the clicking toothed wheel. The anti-reversing pawl is supported at the front portion of the body of the reel so that the pawl is turnable. The anti-reversing pawl is also engaged with the ratchet wheel by a guide spring so that the pawl can be optionally disengaged from the ratchet wheel. The anti-reversing lever cam has a cam surface for moving the clicking claw and is secured to the front end portion of the anti-reversing pawl, so that the clicking claw and the anti-reversing pawl can be moved in the axial direction of the anti-reversing lever shaft and turned against the forces of the springs by the rotation of the anti-reversing lever shaft.

Figure 3:
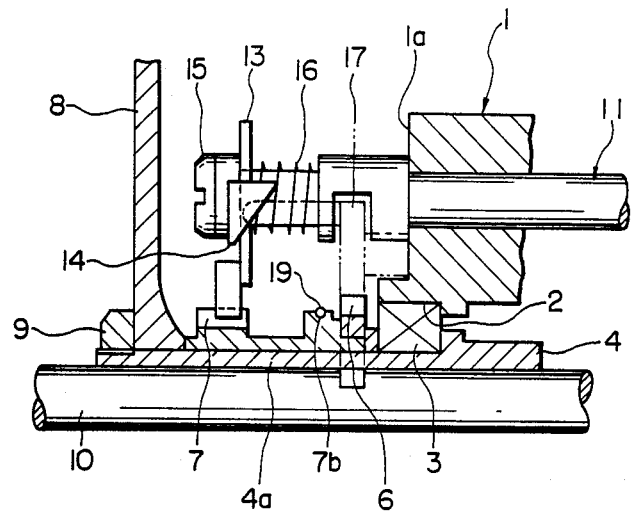
FIG. 3 is a longitudinal partial sectional view of the click sound generator of FIG. 1 in the engaged state of the anti-reversing pawl.
Figure 4:
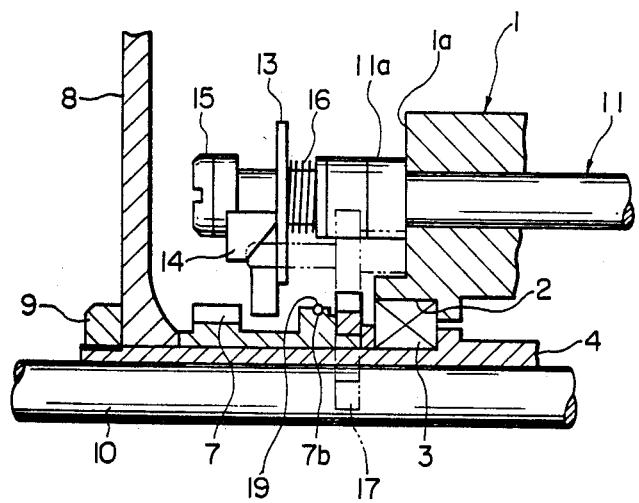
FIG. 4 is a longitudinal partial sectional view of the click sound generator of FIG. 1 in the disengaged state of the anti-reversing pawl.

As shown in FIGS. 3 and 4, a quill 4 is rotatably supported by a bearing 3 in a front bearing hole 2 of a body 1 of a spinning reel in such a manner that the quill is immovable in the axial direction thereof. A portion 4a of the quill 4, which has a unicircular cross section, projects out of the front portion 1a of the reel body 1. A clicking toothed wheel 7 having a shaft hole 5 reviews the portion 4a so that the quill 4 and the clicking toothed wheel 7 are not rotatable relative to each other.

Figure 1:
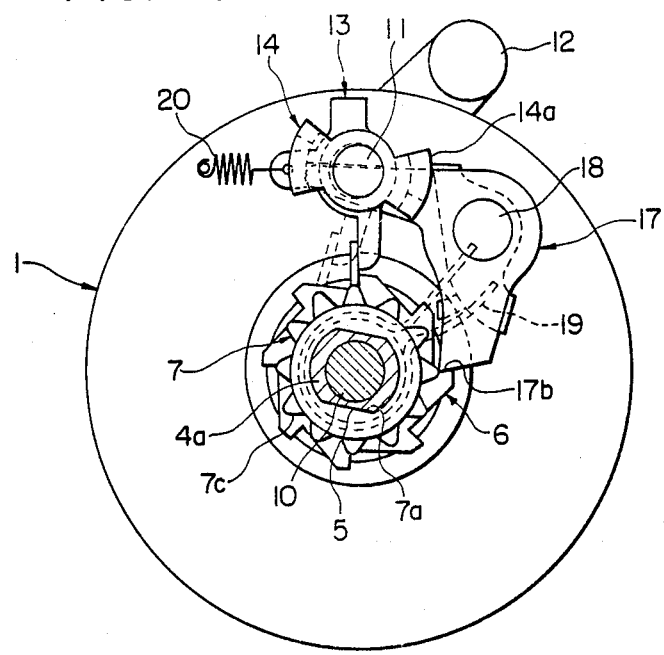
FIG. 1 is a cross-sectional view of an embodiment of the click sound generator of the present invention in the engaged state of an anti-reversing pawl.

As shown in FIGS. 1 and 3, a ratchet wheel 6 is non-rotatably fitted on the outside circumferential surfaces of the boss 7a of the clicking toothed wheel 7. A rotor 8 is secured to the front end portion of the quill 4 by a nut 9. A pinion provided on the rear end portion of the quill 4 (but not shown in the drawings) is engaged with a master gear (not shown) supported in the reel body 1 so that the quill, the ratchet wheel 6, the clicking toothed wheel 7, and the rotor 8 are rotated together in conjunction with the rotation of a handle (not shown).

A main shaft 10 is secured to the front end portion of a spool (not shown) and is movably inserted through the quill 4 so that the main shaft is reciprocated backward and forward by a reciprocative sliding mechanism (not shown) in conjunction with the rotation of the handle.

An anti-reversing lever shaft 11 is supported by the reel body 1 in parallel with the main shaft 10 so that the anti-reversing lever shaft 11 is immovable in the axial direction thereof. A changeover, anti-reversing lever 12 is secured to the anti-reversing lever shaft 11, at a portion that projects out of the rear portion of the reel body 1. A clicking claw 13 is provided on a portion of the anti-reversing lever shaft 11, which projects out of the front portion 1a of the reel body 1. The clicking claw is turnable as well as movable in the axial direction of the anti-reversing lever shaft 11.

As shown in FIG. 5, an anti-reversing lever cam 14 is secured to the front end of the anti-reversing lever shaft 11 by a screw 15 so that the clicking pawl 13 is prevented from coming off the anti-reversing lever shaft 11. A spring 16 is interposed between the clicking claw 13 and a boss 11a or collar of the anti-reversing lever shaft 11 and urges the clicking claw 13 in a direction to engage the clicking toothed wheel 7. The clicking claw 13 and the clicking toothed wheel 7 can be optionally engaged with or disengaged from each other, as shown in FIGS. 1 and 3.

An anti-reversing pawl 17, which can be optionally engaged with or disengaged from the ratchet wheel 6, is rotatably supported by a stepped screw 18 or the like at the front portion 1a of the reel body 1. The end of a guide spring 19 wound in an annular groove 7b of the outside circumferential surface of the boss 7a of the clicking toothed wheel 7 is engaged on the anti-reversing pawl 17. The frictional force of the guide spring 19 on the anti-reversing pawl 17 acts to engage the pawl with the ratchet wheel 6 so that the pawl can be disengaged therefrom.

As shown in FIG. 5, the anti-reversing lever cam 14 has a plurality of projections 14a (for example two projections located in symmetric positions in this embodiment) on the peripheral portion of the cam. One side of each of the projections 14a is provided with a cam surface 14b. The boss 11a of the anti-reversing lever shaft 11 is provided with a groove 11b for engaging the anti-reversing pawl 17 with the ratchet wheel 6.

Figure 2:
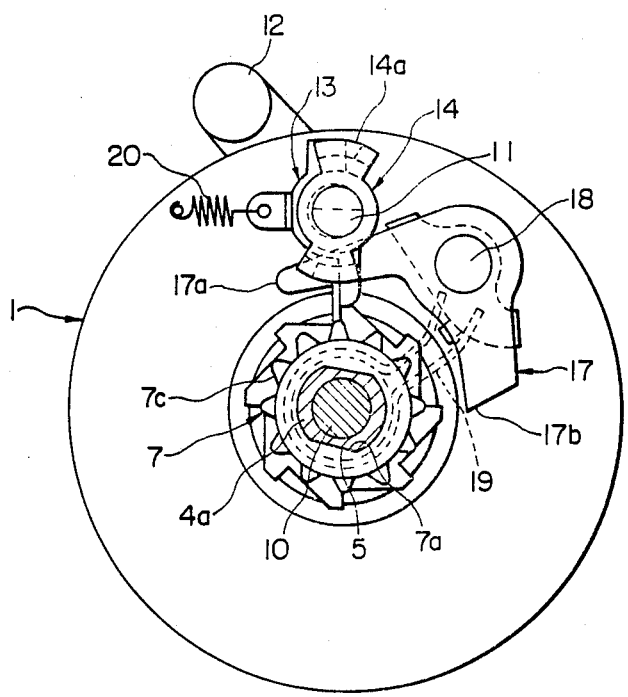
FIG. 2 is a cross-sectional view of an embodiment of the click sound generator of the present invention in the disengaged state of the anti-reversing pawl.

When the anti-reversing lever cam 14 is turned from a position shown in FIG. 1 to a position shown in FIG. 2, by movement of the anti-reversing lever 12, the clicking claw 13 is moved in the axial direction of the anti-reversing lever shaft 11 by the cam surface 14b against the force of the spring 16 so that the clicking claw is separated from the clicking toothed wheel 7. At that time, the bent projection 17a of the anti-reversing pawl 17 is turned in the circumferential direction of the reel body 1 about the stepped screw 18 or the like, from a position shown in FIG. 1 to a position shown in FIG. 2, by the groove end 11c of the anti-reversing lever shaft 11 against the frictional force of the guide spring 19. The tip 17b of the anti-reversing pawl is separated from the ratchet wheel 6, so that the prevention of backward rotation of the rotor 8 is ceased and the generation of a click sound is stopped. The force of a tension spring 20 is applied in such a direction that the click sound is generated when each tooth 7c of the clicking toothed wheel 7 separates from the clicking claw 13.

What is claimed is:

1. A click sound generator for a spinning reel having a reel body rotatably supporting an anti-reverse lever shaft, mounted on an anti-reverse lever, moveable in first and second directions for selectively engaging a means for preventing the backward rotation of a rotor in a reverse rotation prevention position and for allowing reverse rotation of a rotor in a reverse rotation enabling position, respectively, comprising:

a clicking toothed wheel selectively engageable with a clicking claw concentrically mounted on the anti-reverse lever shaft, said clicking claw being operable in conjunction with an anti-reverse lever cam for selective engagement with and disengagement from said clicking toothed wheel;

a spring for biasing said clicking claw into contact with said clicking tooth wheel in the reverse rotation prevention position;

said anti-reverse lever cam concentrically provided on the anti-reverse lever shaft in parallel alignment with said clicking claw, said anti-reverse lever cam configurated to include a projection for contacting said clicking claw to disengage said clicking claw from said clicking tooth wheel to effect said reverse rotation enabling position; and whereby upon selectively rotating said anti-reverse lever in said second direction said clicking claw moves against the bias of said spring and out of contact with said clicking toothed wheel to said reverse rotation enabling position.

2. A click sound generator according to claim 1, wherein said spring is concentrically mounted on the anti-reverse lever shaft and said clicking claw is mounted on the anti-reverse lever shaft for axial movement therealong, and wherein said spring biases said clicking claw in a first axial direction along the anti-reverse lever shaft and said anti-reverse lever cam moves said clicking claw in a second axial direction opposite to said first axial direction along the anti-reverse lever shaft.

3. A click sound generator according to claim 2, wherein said means for preventing the backward rotation of the rotor includes:

a rachet wheel;

an anti-reversing pawl rotatable between a first position for engaging said rachet wheel to prevent reverse rotation of a rotor of said reel and a second position disengaged from said rachet wheel to enable reverse rotation of the rotor; and pawl rotation means responsive to the rotation of the anti-reverse lever shaft from the reverse rotation prevention position to the reverse rotation enabling position for rotating said anti-reversing pawl from said first position to said second position.

4. A click sound generator according to claim 3, wherein said pawl rotation means comprises:

a collar provided on the anti-reverse lever shaft, said collar having a partial circumferential slot therein for receiving an end of said anti-reversing pawl to cause said pawl to rotate to said first position from said second position; and a second spring for guiding said end of said anti-reversing pawl into contact with said collar.

5. A click sound generator according to claim 1, wherein said means for preventing the backward rotation of the rotor includes:

a rachet wheel;

an anti-reversing pawl rotatable between a first position for engaging said rachet wheel to prevent reverse rotation of a rotor of said reel and a second position disengaged from said rachet wheel to enable reverse rotation of the rotor; and pawl rotation means responsive to the rotation of the anti-reverse lever shaft from the reverse rotation prevention position to the reverse rotation enabling position for rotating said anti-reversing pawl from said first position to said second position.

6. A click sound generator according to claim 5, wherein said pawl rotation means comprises:

a collar provided on the anti-reverse lever shaft having a partial circumferential slot therein for receiving an end of said anti-reversing pawl to cause said pawl to rotate to said first position from said second position; and a second spring for biasing said end of said anti-reversing pawl into contact with said collar.

7. A click sound generator for a spinning reel having a reel body rotatably supporting an anti-reverse lever shaft, mounted on an anti-reverse lever, moveable in first and second directions for selectively engaging a means for preventing the backward rotation of a rotor in a reverse rotation prevention position and for allowing reverse rotation of a rotor in a reverse rotation enabling position, respectively, comprising:

a clicking toothed wheel selectively engageable with a clicking claw concentrically mounted on the anti-reverse lever shaft, said clicking claw being operable in conjunction with an anti-reverse lever cam for selective engagement with and disengagement from said clicking toothed wheel;

a spring for biasing said clicking claw into contact with said clicking tooth wheel in the reverse rotation prevention position;

wherein said spring is concentrically mounted on the anti-reverse lever shaft and said clicking claw is mounted on the anti-reverse lever shaft for axial movement therealong, and wherein said spring biases said clicking claw in a first axial direction along the anti-reverse lever shaft and said anti-reverse lever cam moves said clicking claw in a second axial direction opposite to said first axial direction along the anti-reverse lever shaft;

said anti-reverse lever cam concentrically provided on the anti-reverse lever shaft in parallel alignment with said clicking claw, said anti-reverse lever cam configured to include a projection for contacting said clicking claw to disengage said clicking claw from said clicking tooth wheel to effect said reverse rotation enabling position; and whereby upon selectively rotating said anti-reverse lever in said second direction said clicking claw moves against the bias of said spring and out of contact with said clicking toothed wheel to said reverse rotation enabling position.

* * * * *